(12) United States Patent
Decker

(10) Patent No.: US 6,392,363 B1
(45) Date of Patent: May 21, 2002

(54) STARTER FOR A GAS DISCHARGE LAMP, ESPECIALLY A HIGH PRESSURE GAS DISCHARGE LAMP FOR AUTOMOBILE HEADLIGHTS

(75) Inventor: Gerhard Decker, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/701,225
(22) PCT Filed: May 25, 1999
(86) PCT No.: PCT/DE99/01533
   § 371 Date: Feb. 5, 2001
   § 102(e) Date: Feb. 5, 2001
(87) PCT Pub. No.: WO99/62304
   PCT Pub. Date: Dec. 2, 1999

(30) Foreign Application Priority Data

May 27, 1998 (DE) .......................................... 198 23 641

(51) Int. Cl.[7] .............................................. H05B 37/00
(52) U.S. Cl. ......................... 315/289; 315/82; 315/291; 315/307; 307/10.6; 307/10.8
(58) Field of Search .......................... 315/289, 82, 291, 315/219, 200 R, 224, 307; 302/10.6, 10.8

(56) References Cited

U.S. PATENT DOCUMENTS

| 4,723,096 A | 2/1988 | Leighty | 315/200 R |
| 5,004,960 A | 4/1991 | Cockram et al. | 315/209 R |
| 5,994,843 A * | 11/1999 | Kataoka et al. | 315/289 |
| 6,188,180 B1 * | 2/2001 | Diamond | 315/289 |
| 6,194,844 B1 * | 2/2001 | Rupp et al. | 315/289 |

FOREIGN PATENT DOCUMENTS

| DE | 40 17 415 | 2/1991 | H05B/41/36 |
| DE | 44 23 275 | 1/1996 | F21M/7/00 |

* cited by examiner

Primary Examiner—Don Wong
Assistant Examiner—Jimmy T. Vu
(74) Attorney, Agent, or Firm—Kenyon & Kenyon

(57) ABSTRACT

A starter for a gas discharge lamp, in particular a high-pressure gas discharge lamp for a motor vehicle headlight. The gas discharge lamp is supplied with operating power over the secondary side of a transformer. The required starting power is supplied on the primary side of the transformer and is transferred to the secondary side at the starting time. The starting voltage is generated by a cascade circuit, with the cascade circuit of capacitors and diodes provided in the starter circuit to generate the starting voltage at a charge capacitor. The starter circuit is supplied by the bridge circuit which supplies the gas discharge lamp with power for operation, and for the purpose of starting, the bridge circuit is cycled at a frequency which is much higher than the normal frequency for lamp operation. After the lamp has been started, the bridge circuit is switched to the normal frequency in lamp operation. The starter can be implemented in a two-wire concept, a three-wire concept or a four-wire concept. The starter is connected to the control circuit with two, three or four lines accordingly.

11 Claims, 3 Drawing Sheets

STARTER FOR A GAS DISCHARGE LAMP, ESPECIALLY A HIGH PRESSURE GAS DISCHARGE LAMP FOR AUTOMOBILE HEADLIGHTS

FIELD OF THE INVENTION

The present invention relates to a starter for a gas discharge lamp, in particular a high-pressure gas discharge lamp for motor vehicle headlights.

BACKGROUND INFORMATION

In the case of a starter circuit of this type known from German Patent Application No. 44 23 275, the starting voltage is generated with the help of a cascade circuit which increases the voltage, but there is also a d.c./a.c. converter connected upstream from the cascade. The expense of operating the starter in this case should not be underestimated.

In addition, it is known from German Patent No. 40 17 415 that a voltage may be supplied to the primary winding of a starter transformer in a starting device. The secondary winding of this starter transformer then transforms this voltage up to the voltage needed to start the lamp. On the primary side, a capacitor is arranged in parallel with the series connection of the primary winding and a controllable switch such as a controlled thyristor. This capacitor is charged to an effective voltage which is then applied at this point for the purpose of starting. On reaching a certain voltage, the controllable switch is enabled and the capacitor is discharged. With this known starting device, a very high additional voltage is needed over a separate voltage source to charge the capacitor.

SUMMARY OF THE INVENTION

The starter according to the present invention for a gas discharge lamp has the advantage that the required starting voltage is supplied easily, is achieved with very inexpensive components, and the starter is supplied with power directly by the control circuit, i.e., the bridge circuit within the control circuit. This simplifies the starter while reducing the inductance of the starter. This also yields an improvement in radiant emittance. In addition, the present invention makes it possible to integrate the starter and the controller, thus permitting a further reduction in cost and space.

This is achieved according to the present invention by the fact that a cascade circuit of capacitors and diodes is provided in the starter circuit to generate the starting voltage at a charge capacitor; the starter circuit is supplied with power by the bridge circuit which supplies the gas discharge lamp with power for operation; the bridge circuit for starting is cycled at a frequency which is much higher than the normal frequency for lamp operation, and the bridge circuit is switched to the normal frequency for lamp operation after the lamp has been successfully started.

According to especially expedient and advantageous embodiments of the present invention, in principle three different embodiments are possible. This may be a two-wire starter or a three-wire starter or a four-wire starter.

In the case of the advantageous embodiment as a two-wire starter, the starter is connected to the controller with two lines. In an advantageous embodiment and an expedient refinement of this embodiment, a switching element, in particular a spark gap, a transistor or a thyristor, is provided in series with the primary winding of the transformer to generate the starting pulse on reaching the starting voltage on the primary side of the transformer.

In the especially expedient and advantageous embodiment of the starter as a three-wire starter, the starter is connected to the controller by three lines, with one terminal of the primary winding of the transformer being connected directly to the controller without an intermediate switching element, and the other terminal of the primary winding being connected to the output of the cascade. This refinement provides increased safety plus the possibility of integrating the starter and controller.

In another advantageous embodiment of this version of the starter, in the controller the one directly connected terminal of the primary winding of the transformer is short-circuited electronically or mechanically to the instrument ground by a switch or a relay provided there to initiate starting in a controlled manner.

In the case of the advantageous embodiment and refinement of the present invention in the four-wire starter version, the starter is connected to the controller by four lines, where the one terminal of the primary winding of the transformer is connected to the reference ground of the controller by way of a controllable switch, like the one terminal of the charge capacitor, while the other terminal of the primary winding is connected to the output of the cascade, and the fourth line is the control line for the controllable switch. In an expedient embodiment, a relay or a transistor or a thyristor may be used as the controllable switch.

According to an advantageous refinement of the present invention relating to all possible embodiment versions, the two-wire version, the three-wire version or the four-wire version, for starting the bridge circuit of the controller is operated at a frequency of approx. 20 kHz, and after the lamp has been successfully started, it is switched to an operating frequency of approx. 400 Hz.

DETAILED DESCRIPTION

Figure 1:
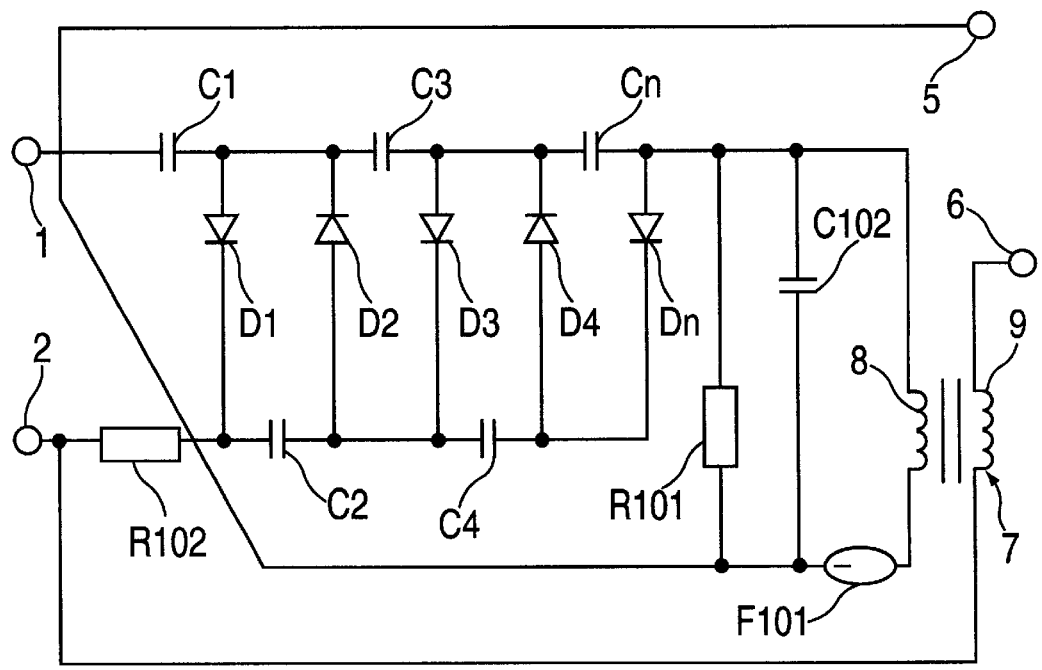
FIG. 1 shows a schematic diagram of the starter in an embodiment of the two-wire starter according to the present invention.

FIG. 1 schematically shows the block diagram of a first embodiment of the starter designed according to the present invention. This embodiment is a two-wire starter, with the starter connected to the controller over two lines and/or terminals 1 and 2. The controller is not shown in detail, nor is the bridge circuit which supplies voltage to the starter at terminals 1 and 2. Thus, the output voltage of the bridge circuit is available as an input voltage at input terminals 1 and 2 of the starter circuit. This voltage may be 300 V, for example. Input 1 also forms output 5 of the starter circuit, and output 2 is connected by way of secondary winding 9 of a transformer 7 to second output 6 of the starter circuit. The gas discharge lamp (not shown) is connected to outputs 5 and 6.

The series connection of a charge capacitor C102 and a spark gap F101 is connected in parallel with primary winding 8 of transformer 7. A discharge resistor R101 is connected in parallel with charge capacitor C102. To generate the required voltage at charge capacitor C102, a cascade circuit composed of capacitors C1 to Cn and diodes D1 to Dn is connected upstream from the charge capacitor. A charge resistor R102 is connected to the cathode of first diode D1 and its other terminal is applied to terminal 2 of the starter. The cascade circuit in succession is designed so that the anode-cathode segment of first diode D1, second capacitor C2, the anode-cathode segment of second diode D2, capacitor C3, the anode-cathode segment of third diode D3, fourth capacitor C4 and the anode-cathode segment of fourth diode D4 are arranged in series with capacitor C1, and also in a similar manner they are arranged across next capacitor Cn and the anode-cathode segment of diode Dn. Charge capacitor C102 is then connected to last capacitor Cn.

The auxiliary starting voltage which is additionally required for starting is thus not generated in the controller with the present invention, but instead is generated with the help of the capacitor-diode cascade formed by capacitors C1 to Cn and diodes D1 to Dn in the starter. Another advantage is that commercial diodes and capacitors can be used for the cascade to advantage. In connecting the controller to the starter, this cascade is connected directly to the output of the bridge circuit which is already present, as illustrated. By cycling the bridge circuit rapidly, the additional auxiliary voltage is generated, as illustrated in detail in the diagrams in FIG. 5.

In order for the additional auxiliary starting voltage to accelerate rapidly, the bridge is cycled at 20 kHz, for example, instead of the usual 400 Hz. The clock frequency of the bridge can be altered through a simple change in program in the microcontroller. After starting, the bridge again operates in the usual start-up and lamp operation mode at an operating frequency of approximately 400 Hz. At this frequency, the cascade is charged slowly, and due to the collapse of the bridge voltage, which takes place due to the starting of the lamp, the end value used for starting is not reached because the lamp is already in operation.

The rise time and the end value of the additional auxiliary starting voltage are independent of the bridge voltage applied to inputs 1 and 2, the number of cascade elements 1 through n used, the components themselves, the bridge frequency, charge resistor R102 for limiting the peak current and any discharge resistor R101 which might be used. The voltage rise time of charge capacitor C102 is adjusted with charge resistor R102, and at the same time the cascade is isolated to a greater extent for normal lamp operation.

With the present invention, the auxiliary starting voltage is increased to 1500 V, e.g., at a bridge voltage of 300 V, for example, because of the cycling and the cascade in the case of a component number of n=5. The spark gap may then be adjusted to 1200 V, for example, or to a value below 1500 V to initiate starting on reaching this voltage. A ramped-up voltage of a sufficient level is generated on secondary side 9 with the aid of the transformation ratio of transformer 7.

Due to the possible increase in auxiliary starting voltage which is possible according to the present invention, it is also possible to change the transformation ratio of starting transformer 7 so that the series inductance which is determined by secondary winding 9 can be reduced to an especially favorable value of 1 mH, for example, with a single-stage starter. Additional advantages derived in addition to the reduction in cost and the space-saving effect include the fact that the total efficiency is increased due to the reduction in total power loss, the starting transfer safety is increased, the EMC emission behavior is improved, and the no-load voltage can be reduced when operating without the starter, thus increasing the safety with regard to hazardous voltages. In addition, it is possible to allow the no-load voltage to fluctuate in a wider range, so the tolerance requirements here can be reduced.

Figure 2:
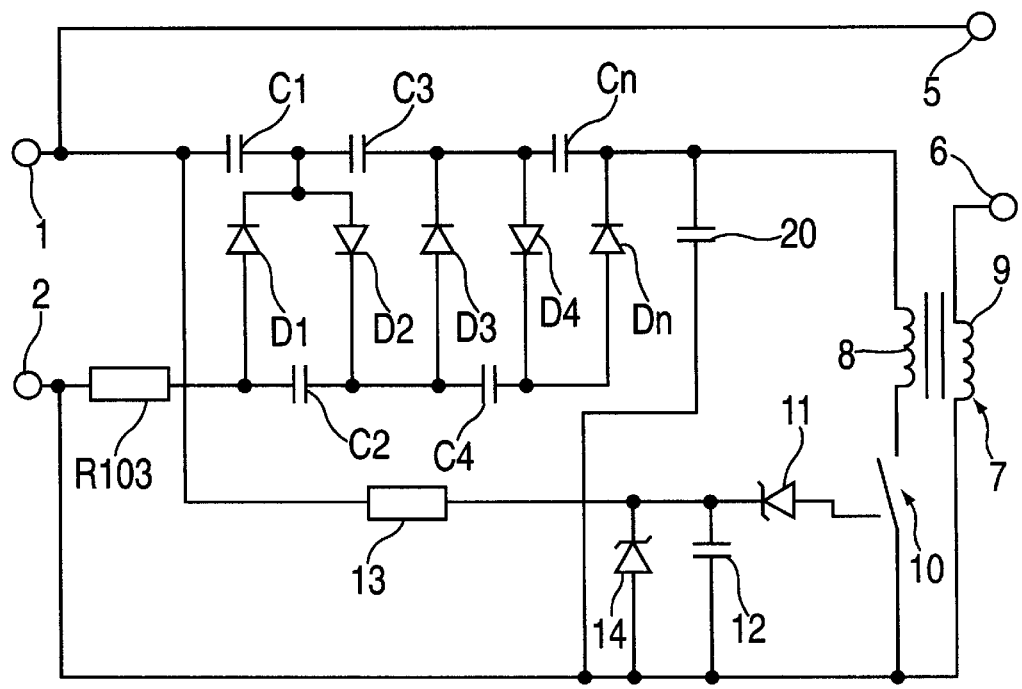
FIG. 2 shows a schematic diagram of an embodiment of the two-wire starter according to the present invention, where starting is initiated by a controllable switching element.

The embodiment shown in FIG. 2 illustrates another example of the two-wire concept of the starter. Instead of a spark gap F101, a MOSFET transistor 10 is provided and is started by a Zener diode 11 and a gate charge capacitor 12 on reaching the proper voltage. Gate charge capacitor 12 is charged across a resistor 13 and has a Zener diode 14 in parallel to limit the voltage.

The version of the two-wire principle illustrated in FIG. 2 for implementation of the present invention offers the advantage in comparison with the embodiment according to FIG. 1 that starting can be initiated with greater control. Thus, there is a greater certainty that the bridge provided in the controller will have the required preferential direction of polarity at the starting moment so that the lamp will reliably accept it. As in the embodiment in FIG. 1, the input of the starter in the embodiment in FIG. 2 is cycled at 20 kHz, for example, at inputs 1 and 2. Diodes D1 to Dn are polarized so that there is a positive voltage at charge capacitor 20 with respect to the reference ground for generating the starting voltage. As long as the bridge circuit cycles, the polarity of the gate voltage is constantly being reversed. A timing element from charge resistor 13 which is connected at the input to input 1 is adjusted with charge capacitor 12 so that the trigger voltage for switch 10 is not reached. The auxiliary starting voltage reaches the end value after the required charging time.

This charging time is applied adequately and is defined in the control program. After this period of time, the bridge is polarized in the preferential direction. Thus, the reference potential of switch 10 is then at −300 V, for example, i.e., −300 V is applied at input 2. The other pole of the starter, i.e., input 1, is at ground potential and thus represents the positive pole for the starter. Then the timing element is charged to the trigger voltage with resistor 13 and charge capacitor 12. Starting occurs after a short delay time. There are various options for the switching elements for switch 10, e.g., a high-voltage transistor, a field effect transistor, an IGBT or a thyristor. It is also advantageous that the N-channel type of transistors which are preferred can thus be used.

Figure 3:
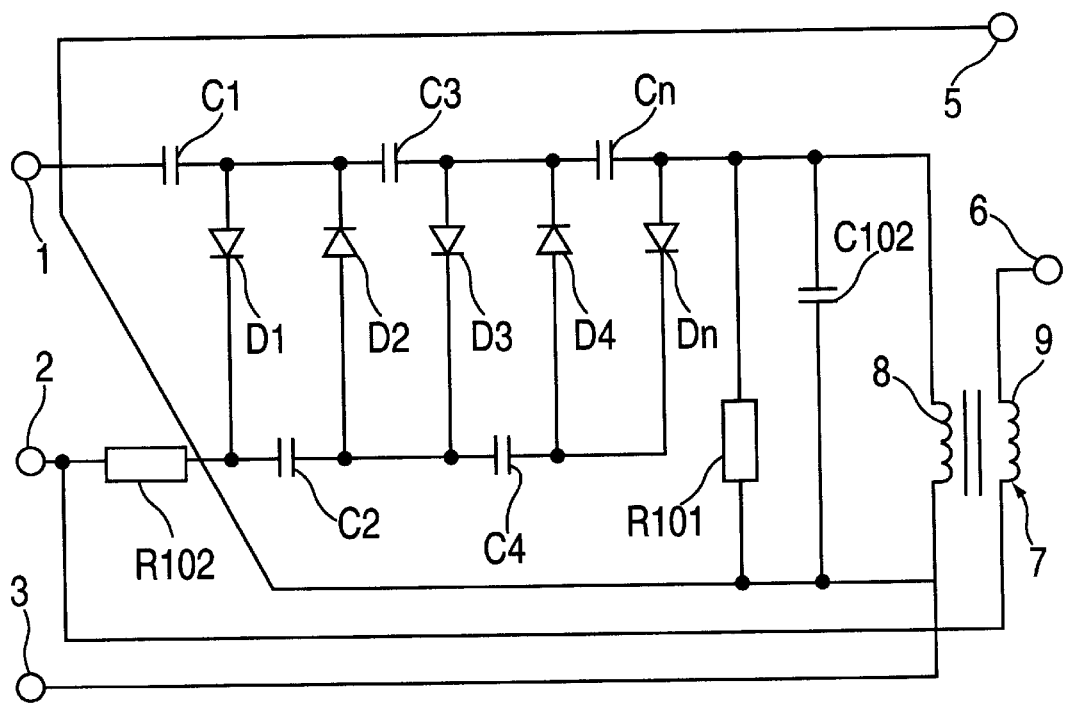
FIG. 3 shows an embodiment of a three-wire starter according to the present invention.

FIG. 3 shows the starter according to the present invention embodied in the form of the three-wire concept, where the starter is connected to the controller (not shown) by three lines 1, 2 and 3. The terminal of primary winding 8 of transformer 7 is the third line 3 and is connected directly to the controller without an intermediate switching element. The other terminal of primary winding 8 of transformer 7 is connected at the output of the cascade, the connection point of capacitor Cn and anode of diode Dn. Otherwise, this circuit then corresponds to the circuit of the starter designed according to the present invention as illustrated in FIG. 1. In this embodiment, a switch which is provided there and may be designed mechanically as a relay or electronically as a transistor is provided in the controller in an advantageous embodiment to short-circuit the terminal of primary winding 8 directly to the instrument ground or to the reference potential. Thus, starting is initiated in a controlled manner. This also has the advantage that when the starter is not connected to the controller and the controller is at the power supply voltage, e.g., the voltage of a motor vehicle battery, there is no voltage on this line 3. This is an essential aspect for increasing safety. This concept is a good basis for integration of the controller and starter.

Figure 4:
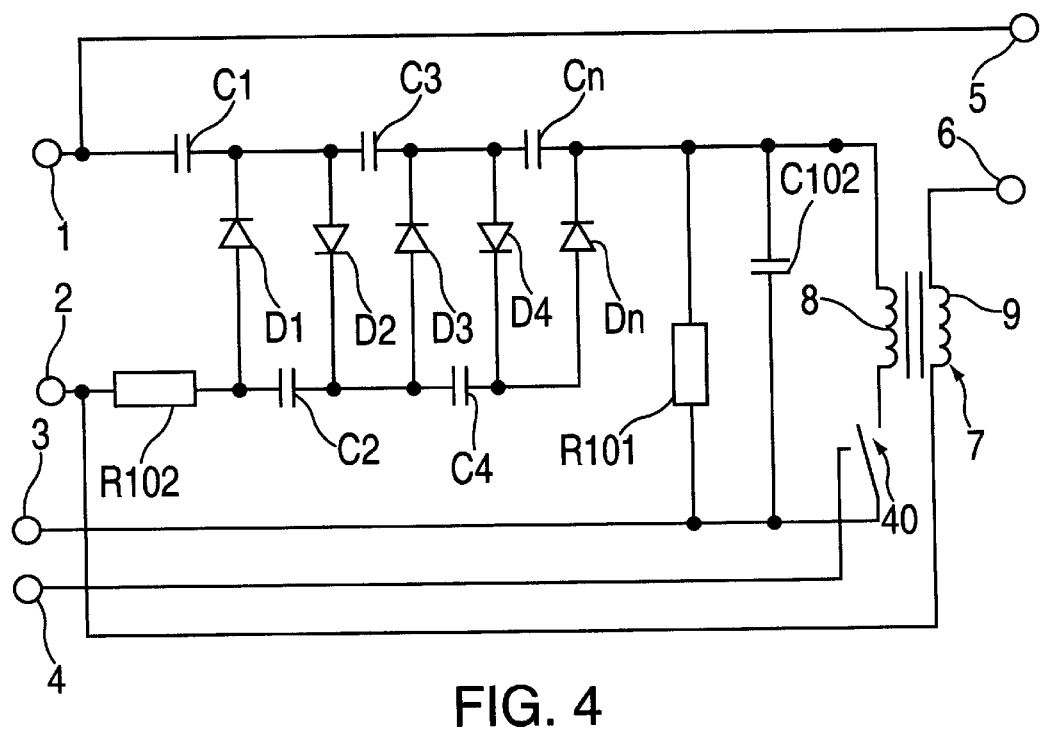
FIG. 4 shows a schematic diagram of a starter according to the present invention which is connected to the controller by four lines.

On the basis of the embodiment illustrated in FIG. 4, the four-wire concept for the starter according to the present invention is demonstrated. The arrangement of the components in a cascade, plus charge capacitor C102, charge resistor R102, discharge resistor R101 and transformer 7 with primary winding 8 and secondary winding 9 is identical to the arrangement illustrated in FIG. 1 with the two-wire concept. The starter illustrated in FIG. 4 is connected to the controller by four lines 1, 2, 3, 4. The one terminal of primary winding 8 of transformer 7 is connected by a controllable switch 40 to line 3 of the controller, where line 3 represents the reference potential of the controller or the instrument ground. The one terminal of charge capacitor C102 and discharge resistor R101 are connected to the reference potential. The control line of switch 40 is connected to fourth line 4 and thus represents the control line of controllable switch 40. A relay, a transistor or a thyristor may be provided as controllable switch 40.

Charge capacitor C102 and the reference ground of controllable switch 40 are connected to the reference ground of the controller. This is the case on line 3. The fourth line 4 is the additional control line for the controlled operation of switch 40. In this way, the discharge circuit remains relatively short and at a low resistance and there are no lines to which the higher auxiliary starting voltage is applied, which ensures greater safety. In this version, integration of the controller and starter is implemented in an especially advantageous manner.

Figure 5:
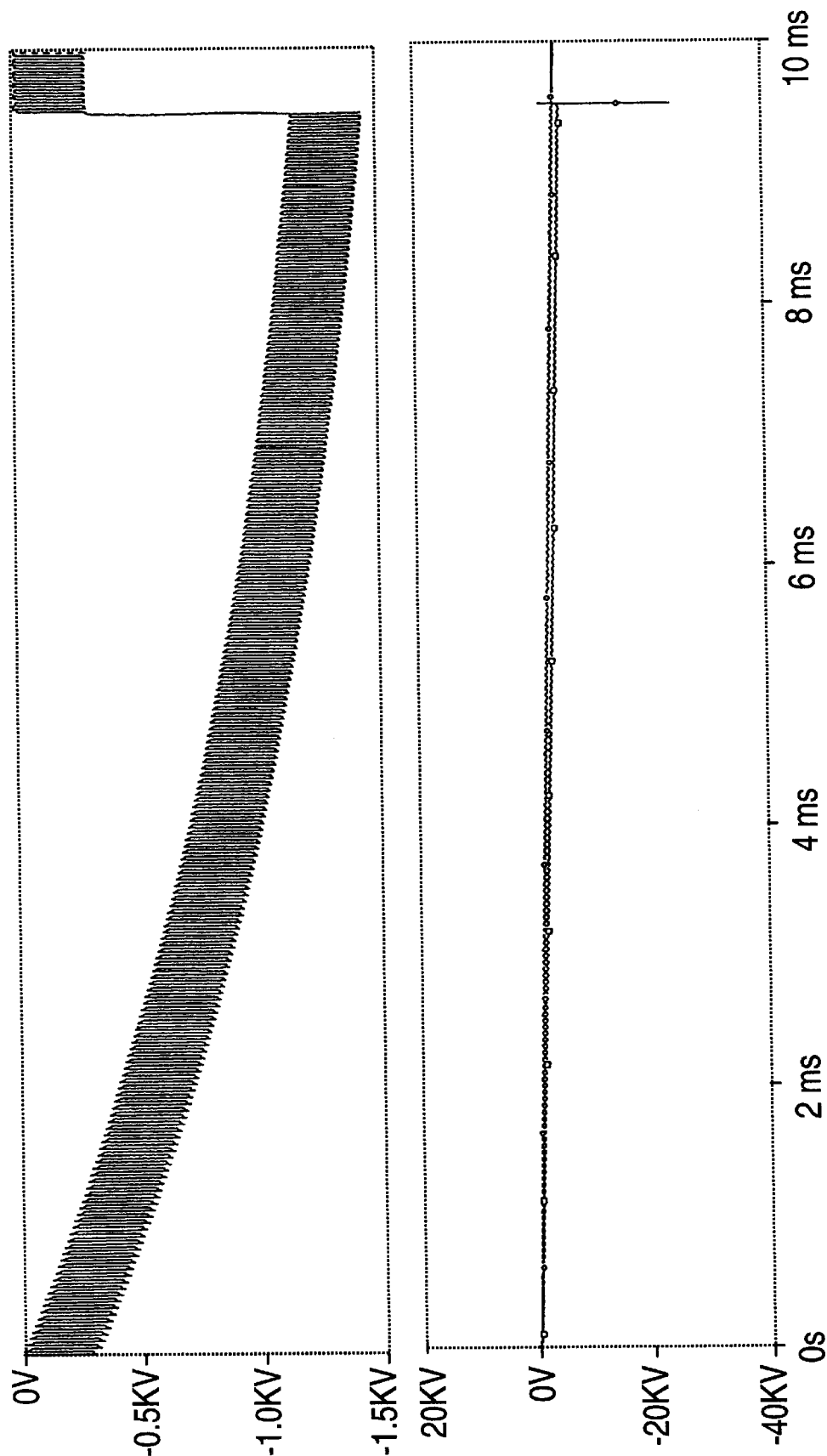
FIG. 5 is a graphic diagram, a simulation plot illustrating the voltage ramp-up and starting of a starter according to the present invention, where this ramp-up can be seen together with the starting pulse in the upper part of the ramp-up of the cascade voltage and in the lower diagram on a smaller scale.

The top part of FIG. 5 shows a diagram illustrating a voltage ramp-up on the diode-capacitor cascade in a simulation plot, namely starting from the voltage at 0 V up to approximately −1.5 kV up to the time when the lamp is started. The lower part shows the same curve on a larger scale, where the starting pulse amounting to approximately 20 kV can be seen better in its entirety because of the scale, whereas the increase in voltage in ramp-up to the starting voltage turns out to be much lower due to the scale. Starting is achieved after a ramp-up time of barely 10 milliseconds. The upper part of the diagram very clearly shows the relatively high frequency at which the bridge is cycled and accordingly the voltage curve fluctuates gradually but within a justifiably short period of time up to the starting value.

The advantages achieved on the whole with the present invention, regardless of whether using the two-wire concept, the three-wire concept or the four-wire concept, include in particular lower costs, fewer components and smaller space required. An increase in the total efficiency and a reduction in total power loss with an increase in starting transfer safety are achieved. The EMC emission behavior is improved and the no-load voltage is reduced in operation without a starter, which results in a greater safety with respect to hazardous voltages. Furthermore, the tolerance of the no-load voltage can be expanded, and starting can be controlled in a controllable manner by a simple function in the software. On the whole, the present invention permits integration of the starter and controller, thus yielding a further reduction in cost and space requirement.

What is claimed is:

1. A starter for a high-pressure gas discharge lamp for a motor vehicle headlight, the starter being supplied with power by a bridge circuit, the bridge circuit also supplying the gas discharge lamp with operating power, the bridge circuit being cycled for starting at a frequency which is substantially higher than a normal frequency for lamp operation and being switched to the normal frequency for lamp operation after the lamp has been successfully started, the starter comprising:

a transformer including a primary winding and a secondary winding, the secondary winding being supplied with the operating power of the gas discharge lamp, the primary winding being supplied with a required starting power, the starting power being transferred to the secondary winding at a starting time;

a charge capacitor; and a cascade circuit which generates a starting voltage at the charge capacitor, the cascade circuit including a plurality of capacitors and a plurality of diodes.

2. The starter of claim 1, further comprising:

a switching element, the switching element being in series with the primary winding of the transformer, the switching element generating a starting pulse when the starting voltage is reached on the primary winding of the transformer.

3. The starter of claim 2, wherein the switching element is a spark gap.

4. The starter of claim 2, wherein the switching element is a transistor.

5. The starter of claim 2, wherein the switching element is a thyristor.

6. The starter of claim 1, further comprising:

two lines, the two lines connecting a controller to the starter.

7. The starter of claim 1, further comprising:

three lines, the three lines connecting a controller to the starter, one of the three lines connecting a first terminal of the primary winding of the transformer directly to the controller without an intermediate switching element;

wherein the cascade circuit further includes an output, the output being connected to a second terminal of the primary winding of the transformer.

8. The starter of claim 7, wherein the line directly connecting the first terminal of the primary winding of the transformer to the controller is short-circuited to an instrument ground by one of a switch and a relay provided at the controller to initiate starting in a controlled manner.

9. The starter of claim 1, further comprising:

a controllable switch; and four lines, the four lines connecting a controller to the starter, one of the four lines connecting a first terminal of the primary winding of the transformer to a reference ground of the controller by way of the controllable switch, the one line also connecting a terminal of the charge capacitor to the reference ground of the controller, another of the four lines being a control line for the controllable switch;

wherein the cascade circuit further includes an output, the output being connected to a second terminal of the primary winding of the transformer.

10. The starter of claim 9, wherein the controllable switch is one of a relay, a transistor, and a thyristor.

11. The starter of claim 1, wherein the bridge circuit of a controller is operated at a frequency of about 20 kHz, and after the lamp has been successfully started, the bridge circuit is switched to an operating frequency of about 400 Hz.

* * * * *